United States Patent
Lee et al.

(10) Patent No.: US 7,196,686 B2
(45) Date of Patent: Mar. 27, 2007

(54) LIQUID CRYSTAL DISPLAY AND DRIVING METHOD THEREOF

(75) Inventors: Chang-Hun Lee, Suwon (KR); Jae-Jin Lyu, Kyungki-do (KR); Hee-Young Cho, Suwon (KR); Hak-Sun Chang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 455 days.

(21) Appl. No.: 10/451,079

(22) PCT Filed: Nov. 6, 2001

(86) PCT No.: PCT/KR01/01883

§ 371 (c)(1),
(2), (4) Date: Jun. 19, 2003

(87) PCT Pub. No.: WO03/032056

PCT Pub. Date: Apr. 17, 2003

(65) Prior Publication Data

US 2004/0246388 A1 Dec. 9, 2004

(30) Foreign Application Priority Data

Oct. 8, 2001 (KR) .............................. 2001-61904

(51) Int. Cl.
*G09G 3/36* (2006.01)
(52) U.S. Cl. .......................... 345/102; 345/92; 345/99
(58) Field of Classification Search .......... 345/87–104; 349/123–136
See application file for complete search history.

(56) References Cited

U.S. PATENT DOCUMENTS

| | | | | |
|---|---|---|---|---|
| 4,721,367 | A | * | 1/1988 | Yoshinaga et al. .......... 349/184 |
| 5,621,558 | A | * | 4/1997 | Shimada et al. ............ 349/130 |
| 6,005,646 | A | * | 12/1999 | Nakamura et al. ............ 349/33 |
| 6,061,116 | A | * | 5/2000 | Nishida et al. .............. 349/130 |
| 6,221,444 | B1 | * | 4/2001 | Okada et al. ............... 428/1.25 |
| 6,423,385 | B1 | * | 7/2002 | Kagawa et al. .............. 428/1.1 |
| 6,469,762 | B1 | * | 10/2002 | Hong et al. ................. 349/123 |
| 6,693,695 | B2 | * | 2/2004 | Okada et al. ............... 349/130 |
| 6,927,825 | B1 | * | 8/2005 | Koma et al. ................. 349/133 |
| 2002/0044116 | A1 | * | 4/2002 | Tagawa et al. ............... 345/87 |

FOREIGN PATENT DOCUMENTS

| | | |
|---|---|---|
| EP | 1 107 223 A2 | 6/2001 |
| EP | 1 113 412 A2 | 7/2001 |
| JP | 2000-321556 | 11/2000 |

OTHER PUBLICATIONS

Supplementary European Search Report for Application No. 01983843.2-2205; Dated Nov. 16, 2006.

* cited by examiner

*Primary Examiner*—Richard Hjerpe
*Assistant Examiner*—M. Fatahiyar
(74) *Attorney, Agent, or Firm*—Cantor Colburn LLP

(57) ABSTRACT

A liquid crystal display includes an LCD panel, a source driver outputting image signals to the LCD panel, a gate driver sequentially outputting scanning signals to the LCD panel. At the same time of power on, high-level bias voltages are applied to a common electrode line of the LCD panel, and simultaneously, driving of the source driver and the gate driver are stopped. After a specific time has passed, common electrode voltages are applied to the common electrode lines of the liquid crystal display instead of the high-level bias voltages to drive the source driver and the gate driver.

16 Claims, 3 Drawing Sheets

LIQUID CRYSTAL DISPLAY AND DRIVING METHOD THEREOF

BACKGROUND OF THE INVENTION (a) Field of the Invention

The present invention relates to a liquid crystal display and driving method thereof, and more specifically, to a liquid crystal display and driving thereof to highly increase the speed of bend alignment at initial operation such as right after power application in a liquid crystal display with an OCB mode.

(b) Description of the Related Art

In general, since a liquid crystal display (LCD) is much thinner, much light-weighted and less consumed in power than a cathode ray tube prevailing in an image display device at present, it is already wide-used as an image display device of portable information devices such as a mobile phone and a notebook computer, and it is so small in radiation of an electromagnetic wave that it is expected to prevail in an image display device for table instead of the cathode ray tube.

Such an LCD has a disadvantage that a viewing angle feature of changing brightness and color is large depending on a direction where a screen is seen. Several methods to overcome this advantage have been proposed.

For example, a method, which increases an orthogonal brightness more than 30 percent by attaching a prism plate to surface of light transmitting plate to increase traveling straight of an incident light in order to improve the viewing angle of an LCD, has been put to practical use, and another method, which attaches a negative optical compensating plate to surface of light transmitting plate to increase the viewing angle, is being used.

In addition, owing to an In Plane Switching mode, a wide viewing angle almost equal to a CRT level is accomplished because a viewing angle in all direction is 160°, but it is so low in an aperture rate that it is needed to improve this.

Besides the above methods, a variety of trials to improve a viewing angle are being made by driving methods such as OCB (Optical Compensated Birefringency) method, PDLC (Polymer Dispersed Liquid Crystal) method and DHF (Deformed Helix Ferroelectric) method by a TFT.

Especially, since the OCB mode has advantages that response speed of liquid crystal is high and its viewing angle is wide, it is vigorously in the process of research and development.

An operation of the above OCB mode will be described in brevity with reference to FIG. 1.

FIG. 1 is a diagram to illustrate an operation of a normal OCB mode, and FIG. 2 is a diagram to illustrate ON/OFF cycle of the OCB mode.

Referring to FIG. 1, an initial alignment state of the liquid crystal that poses between an upper plate electrode and a lower plate electrode is a Homogeneous state (hereinafter referred to as "H"). When a specific voltages is applied to the upper/lower plate electrode, its state is changed through a Transient splay (hereinafter referred to as "T") and an Asymmetric splay (hereinafter referred to as "A") to a Bend state (hereinafter referred to as "B"), and then it works as an OCB mode.

As shown in FIG. 1, generally, an OCB liquid crystal cell is made to have pretilt angle of about 3°~20° in the vicinity of alignment film, the thickness of the liquid crystal cell is made to be 4~10 μm and the alignment film is made to be rubbed in the same direction. Since the arrangement of the liquid crystal molecules in the center of the liquid crystal layer is symmetry for left and right side, a tilt angle becomes 0° below a specific voltages, and 90° over a specific voltages. Therefore, by applying a large voltages to the liquid crystal, it is made to be 90° for tilt angle of liquid crystal molecules in the center of liquid crystal layer, and by changing the voltages applied thereto, a tilt of vicinity of the alignment film and liquid crystal molecules in the middle layer except for the liquid crystal molecules layer in the center of the liquid crystal layer is made to be changed, and thus polarization of the light transmitting through the liquid crystal layer is modulated.

Although it typically takes several seconds for tilt angle to arrange from 0° to 90°, the OCB liquid crystal cell has a feature that response time is very short such an extent of 10 ms because of voltages change thereafter with no back-flow and a bend transformation with an high elastic coefficient.

As shown in FIG. 2a, in the ON state of normal OCB mode, its change is rapid from T to A and is relatively rapid from T to B, but is slow from A to B, as also shown in FIG. 2b, in the OFF state of normal OCB mode, its change is slow from B to H, but is rapid from T to H or from A to H.

As described above, there is a problem that it takes a certain time to obtain a bend alignment for an OCB mode. In particular, there is a problem that it is possible to use an LCD, by applying a large voltages thereto for a short time after turning on a power switch of a PC monitor or a TV to have to induce bend alignment transition for the whole panel of the LCD panel.

SUMMARY OF THE INVENTION

The technique and object of the present invention is to solve the above problems, and an object of the present invention is to provide a liquid crystal display to highly increase the speed of a bend alignment in the LCD with an OCB mode at an initial operation.

In addition, further object of the present invention is to provide a method for driving an LCD to highly increase the speed of bend alignment at an initial operation such as right after power application in the LCD with an OCB mode.

The LCD has an LCD panel, a source driver outputting image signals to the LCD panel and a gate driver sequentially outputting scanning signals to the LCD panel. At the same time of power on, high-level bias voltages are controlled to be applied to common electrode lines of the LCD, and simultaneously the driving of the source driver and the gate driver is stopped, and according as a specific time has passed, common electrode voltages are controlled to be applied to the common electrode lines of the liquid crystal display instead of the bias voltages, and the source driver and the gate driver are controlled to be driven.

Here, the LCD panel have a liquid crystal with an OCB mode.

In addition, the high-level bias voltages may be provided from an external device, or generated on the basis of the supply voltages provided to the gate driver.

Furthermore, an LCD according to another feature to implement the above object comprises:

a LCD panel including a plurality of gate lines, a plurality of source lines crossing with the gate lines, and common electrode lines;

a back light unit located in one side of the LCD panel to output a specific light thereto;

a back light unit located on one side of the LCD panel to output a specific light to the LCD panel;

an inverter outputting a back light voltages for driving the back light unit;

a switching unit first-switching the output of at least one of gate voltages for scanning signals, data voltages for image signals and driving voltages for the back light voltages, and second-switching the output of one of bias voltages and common electrode voltages; and a timing controller, at the same time of power on, outputting a first switching signal for controlling the first switching operation to the switching unit to stop the output of the gate voltages, the data voltages and the driving voltages, and outputting a second switching signal for controlling the second switching operation to the switching unit to control the output of the bias voltages, and, according as a specific time has passed, outputting a first switching signal for controlling the first switching operation to the switching unit to control the output of the gate voltages, the data voltages and the driving voltages, and outputting a second switching signal for controlling the second switching operation to the switching unit to control the output of the common electrode voltages, thereby making the speed of a bend alignment transition of a liquid crystal disposed in the LCD panel high.

Here, the LCD panel is characterized to have a liquid crystal with an OCB mode.

Moreover, at an initial operation, voltages applied to the common electrode line are characterized to be external bias voltages applied thereto one time, and further characterized to be external bias voltages repeating on and off, and also further characterized to be voltages that either the high-level bias voltages or the common electrode voltages are repeatedly applied thereto.

A method of an LCD, which has a LCD panel with liquid crystal, a gate driver, a source driver, and a back light unit, according to one feature to implement another object of the present invention comprise:

(a) forcibly stopping the gate driver and the source driver simultaneously as initially starting the LCD, (b) applying high-level bias voltages supplied independently to the common electrode lines of the LCD panel to induce a bend alignment transition by a high transition difference;

(c) driving the gate driver and the source driver according as a certain time has passed, and (d) applying common electrode voltages to the common electrode lines instead of the high-level bias voltages, and applying specific back light driving voltages to the back light unit.

According to this LCD and the driving method thereof, at an initial operation, by applying the high-level bias voltages instead of the common electrode voltages and stopping driving of the gate driver, the source driver and the back light, the speed of the initial bend alignment may be highly increased in the LCD with an OCB mode.

DETAILED DESCRIPTION OF THE PREFERRED EMBODIMENTS

Embodiments will be described for those skilled in the art to practice easily.

Figure 1:
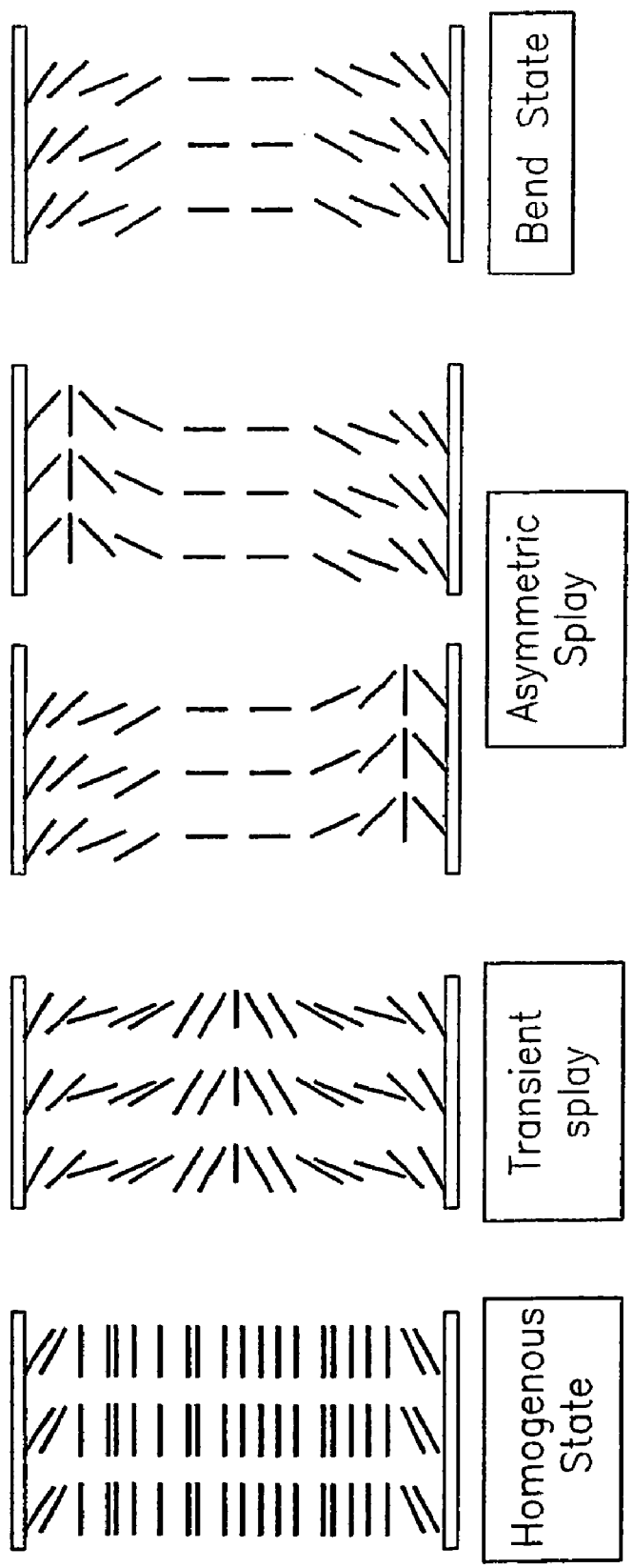
FIG. 1 is a diagram to illustrate an operation of a normal OCB mode.
Figure 2:
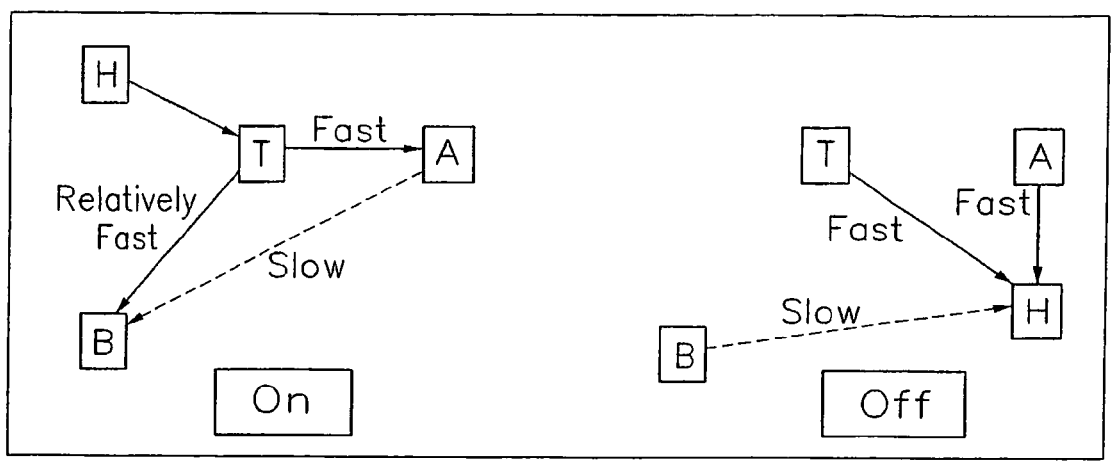
FIG. 2 is a diagram to illustrate an ON/OFF cycle of a normal OCB mode.
Figure 3:
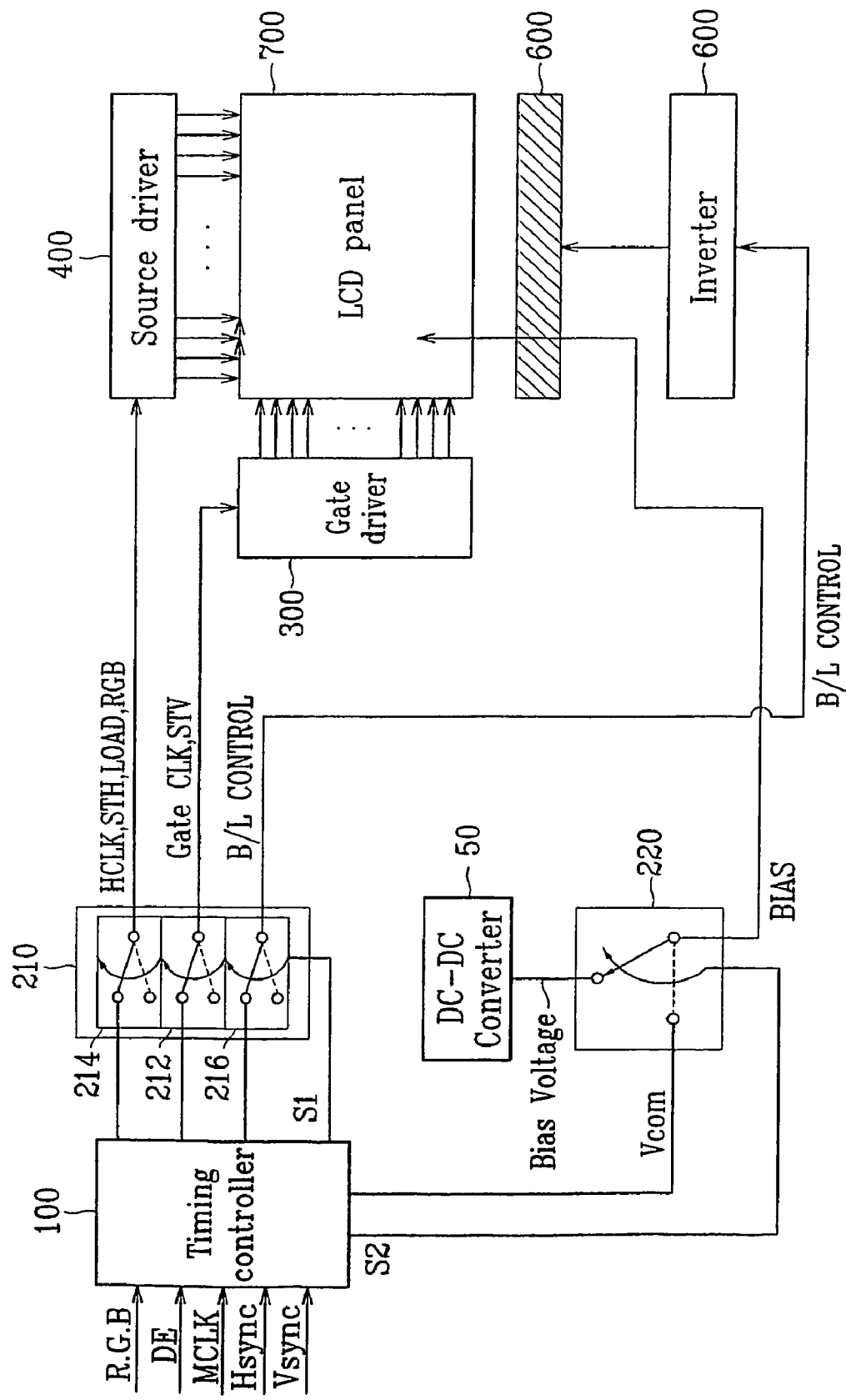
FIG. 3 is a diagram to illustrate an LCD for highly increasing the speed of initial bend alignment according to an embodiment of the present invention.

FIG. 3 is a diagram to illustrate an LCD for highly increasing the speed of initial bend alignment according to an embodiment of the present invention.

Referring to FIG. 3, an LCD according to an embodiment of the present invention includes a DC to DC converter 50, a timing controller 100, a first switching unit 210, a second switching unit 220, a gate driver 300, a source driver 400, an inverter 500, a back light unit 600 and an LCD panel 700.

In general, an LCD module raises or reduces supply voltages required to each of circuit blocks from a single supply independent of a notebook and its monitor, and then it generates required voltages to use it. There are supply units of the LCD module such as the DC to DC converter 50 and the inverter 500 for driving the back light.

The timing controller 100 is provided with image signals R, G and B inputted from an external graphic controller (not shown) and control signals DE, MCLK, Hsync and Vsync for displaying the image signals, respectively. And then it outputs a signal for the gate driver 300 and a signal for the source driver 400, and provides a first switching signal S1 to the first switching unit 210 and a second switching signal S2 to the second switching unit 220.

That is, at an initial operation of the LCD, the timing controller 100 is controlled so that the outputs of the high-level bias voltages from an external device are applied to the common electrode lines of the LCD panel 700 and the driving of the gate driver 300 and the source driver 400 is stopped, thereby highly increasing the speed of bend alignment transition in the LCD with an OCB mode.

Then, the timing controller 100 is controlled so that the common electrode voltages to the common electrode line of the LCD panel 700 is outputted, and signals for driving the gate driver 300 and the source driver 400, and a signal for driving the back light are outputted. Here, at an initial operation, the timing controller 100 may be controlled so that a high-level bias voltages are applied one time, bias voltages repeating on and off are applied, or bias voltages and common electrode voltages are alternately applied.

The first switching unit 210 includes a first switch 212, a second switch 214 and a third switch 216 to switch output of the gate voltages, the data voltages and the back light voltages depending on the first switching signal S1.

More in detail, the first switch 212 controls signals Gate clk and STV for driving the gate driver provided from the timing controller on the basis of the first switching signal S1, and preferably, when the first switching signal S1 with OFF level is applied, the switch 212 stops the output of signals Gate clk and STV for driving the gate driver, when the first switching S1 with On level is applied, the switch controls the output of signals Gate clk and STV for driving the gate driver.

The second switch 214 controls signal HCLK, STH, LOAD and RGB for driving the source driver provided the timing controller 100 on the basis of the first switching signal S1, and preferably, when the first switching signal S1 with OFF level is applied, the switch 214 stops the output of signals HCLK, STH, LOAD and RGB for driving the source driver 400, when the first switching S1 with ON level is applied, the switch 214 controls the output of signals HCLK, STH, LOAD and RGB for driving the source driver 400.

The third switch 216 controls signal B/L CONTROL for driving the back light provided from the timing controller 100 on the basis of the first switching signal S1, and preferably, when the first switching signal S1 with OFF level is applied, the switch 216 stops the output of signal B/L CONTROL for driving the back light, and when the first switching S1 with On level is applied, the switch 216 controls the output of signal B/L CONTROL for driving the back light.

The second switching unit 220 outputs high-level bias voltages from an external device to the common electrode lines of the LCD panel on the basis of the second switching signal S2 at an initial operation, and then, it outputs the common electrode voltages instead of the high-level bias voltages after a certain time has passed.

The inverter 500 applies specific voltages for driving the back light unit 600 disposed on one side of the LCD panel 700 depending on a back light control signal from the timing controller 100. In general, the inverter 500 for driving the back light is combined with the LCD module in the whole system as a form of separate module mounting parts such as a chauffer, a transformer, etc.

The LCD panel 700 is formed of a plurality of pixels made of m×n matrix, which drives related built-in pixel electrodes in response to the data voltages D1–Dm provided from the source driver 400 by applying the gate voltages G1–Gn from the gate driver 300 to the related pixel electrodes. In this case, since large voltages are initially applied to the liquid crystal molecules with OCB mode built in the LCD panel 700, it is possible that it takes a very short time to make a tilt angle of the liquid crystal molecules in the center of the liquid crystal layer 90°.

In particular, since the LCD panel is not provided with any voltages from the gate driver or the source driver at an initial operation, its pixel electrodes are kept a floating state, and perform bend alignment of the liquid crystal in the state that the high-level bias voltages are applied to only upper plate electrodes. Also, its pixel electrodes are provided with the data voltages from the source driver after a specific time, preferably, 500 ms has passed, so that some images are displayed.

Although, as above, the first switching unit is prepared separately in order to control the outputs of signals applied to the gate driver and the source driver and the output of signal for driving the back light with ON/OFF, it may be disposed within the timing controller to perform so.

Furthermore, although at an initial operation of the LCD, more in detail, at the same time of an initial operation, high-level bias voltages from an external DC to DC converter as an example are provided to the common electrode lines of the LCD panel, the high-level bias voltages may be generated on the basis of supply voltages provided to the gate driver. For example, assuming that voltages for starting a gate driver are 27 Volts, it is easy to those skilled in the art that raising the voltages to be applied to common electrode lines of an LCD panel can generate high-level bias voltages of 30 Volts.

As mentioned above, at an initial operation of the LCD with an OCB mode, in order to obtain a bend alignment transition at high speed, the driving of the source driver and the gate driver is stopped, and the high-level bias voltages instead of the common electrode voltages are applied to the common electrode lines, and hence the time of bend alignment of the liquid crystal can be much reduced.

Here, at an initial operation of the LCD, high-level bias voltages may be applied one time, a bias voltages repeating ON/OFF may be applied, or bias voltages and common electrode voltages may be alternately applied, but, even though the bias voltages are applied one time, it is enough to highly increase the speed of a bend alignment transition.

Although the present invention has been described with reference to the preferred embodiments, it will be appreciated for those skilled in the art that versatile changes and modifications of the present invention can be made without departing from spirit and scope described in the accompanying claims.

As described above, according to the present invention, at an initial operation of the LCD with OCB mode, the high-level bias voltages are controlled to be applied to the common electrode line of the LCD panel, and the driving of the gate driver, the source driver and the back light are controlled to be stopped, and, after an initial operation, specific common electrode voltages are controlled to be applied to the common electrode lines instead of the bias voltages, and the driving of the gate driver or the source driver and the back light are controlled to be performed, thereby highly increasing the speed of a bend alignment transition of the liquid crystal at an initial operation of the LCD with OCB mode.

What is claimed is:

1. A liquid crystal display comprising:
   an LCD panel;
   a back light unit to output a light to the LCD panel;
   a source driver outputting image signals to the LCD panel; and
   a gate driver sequentially outputting scanning signals to the LCD panel, wherein at the same time of power on, high-level bias voltages are applied to common electrode lines of the LCD panel, and simultaneously, driving of the source driver, the gate driver and the back light unit are stopped, and after a specific time has passed, common electrode voltages are applied to the common electrode lines of the liquid crystal display instead of the high-level bias voltages to drive the source driver and the gate driver and a signal for driving the back light unit is outputted.

2. The liquid crystal display of claim 1, wherein the LCD panel has a liquid crystal with an OCB mode.

3. The liquid crystal display of claim 1, wherein the high-level bias voltages are provided from an external device.

4. The liquid crystal display of claim 1, wherein the high-level bias voltages are generated on the basis of supply voltages provided to the gate driver.

5. A liquid crystal display comprising:
   an LCD panel having a plurality of gate lines, a plurality of source lines crossing the gate lines, and common electrode lines;
   a back light unit located on one side of the LCD panel to output a specific light to the LCD panel;
   an inverter outputting back light voltages for driving the back light unit;
   a switching unit first-switching the output of at least one of gate voltages for scanning signals, data voltages for image signals and driving voltages for the back light voltages, and second-switching the output of any one of bias voltages and common electrode voltages; and
   a timing controller outputting a first switching signal at the same time of power on for controlling the first switching operation to the switching unit stopping the output of the gate voltages, the data voltages and the driving voltages, and outputting a second switching signal for controlling the second switching operation to the switching unit to control the output of the bias voltages, and after a specific time has passed, outputting a first switching signal controlling the first switching operation to the switching unit to control the output of the gate voltages, the data voltages and the driving voltages, and outputting a second switching signal controlling the second switching operation to the switching unit to control the output of the common electrode voltages, thereby increasing a speed of a bend alignment transition of a liquid crystal disposed in the LCD panel by applying the bias voltages instead of the common electrode voltages to the common electrode lines and simultaneously stopping the driving of the gate driver, the source driver and the back light unit.

6. The liquid crystal display of claim 5, wherein the LCD panel has the liquid crystal with an OCB mode.

7. The liquid crystal display of claim 5, wherein at an initial operation of the LCD, voltages applied to the common electrode lines are high-level bias voltages that are applied to the common electrode lines once.

8. The liquid crystal display of claim 5, wherein at an initial operation of the liquid crystal display, voltages applied to the common electrode lines are high-level bias voltages repeating on and off.

9. The liquid crystal display of claim 5, wherein at an initial operation of the liquid crystal display, the voltages applied to the common electrode lines are voltages that either the high level bias voltages or the common electrode voltages are repeatedly applied.

10. The liquid crystal display of claim 5, wherein at an initial operation, the LCD panel is kept in a floating state.

11. The liquid crystal display of claim 10, wherein the LCD panel includes pixel electrodes kept in the floating state until the liquid crystal substantially turns into a bend alignment.

12. A method for driving a liquid crystal display including an LCD panel having a liquid crystal, a gate driver, a source driver and a back light unit, the method comprising:
    (a) forcibly stopping the driving of the gate driver, the source driver and the back light unit simultaneously as initially starting the LCD,
    (b) applying high-level bias voltages supplied independently to the common electrode lines of the LCD panel to induce a bend alignment transition by a high transition difference;
    (c) driving the gate driver and the source driver after a certain time has passed,
    (d) applying common electrode voltages to the common electrode lines instead of the high-level bias voltages, and
    (e) applying a specific back light driving voltage to the back light.

13. The method of claim 12, wherein the LCD panel has a liquid crystal with an OCB mode.

14. The method of claim 12, wherein at an initial operation of the LCD, the voltages applied to the common electrode lines are high-level bias voltages applied once thereto.

15. The method of claim 12, wherein at an initial operation of the liquid crystal display, the voltages applied to the common electrode lines are high-level bias voltages repeating on and off.

16. The method of claim 12, wherein at an initial operation of the liquid crystal display, the voltages applied to the common electrode lines are voltages that either the high-level bias voltages or the common electrode voltages repeatedly applied.

* * * * *